United States Patent
Wang et al.

(10) Patent No.: US 7,564,215 B2
(45) Date of Patent: Jul. 21, 2009

(54) AUXILIARY BODY WITH SECURING MECHANISM AND PORTABLE ELECTRONIC DEVICE USING THE SAME

(75) Inventors: He-Li Wang, Guangdong (CN); Xiang-Hui Zhang, Guangdong (CN); Wen-Jie Bao, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 458 days.

(21) Appl. No.: 11/306,970

(22) Filed: Jan. 17, 2006

(65) Prior Publication Data

US 2006/0284592 A1    Dec. 21, 2006

(30) Foreign Application Priority Data

Jun. 18, 2005    (CN)    .................. 2005 2 0060285 U

(51) Int. Cl.
*H02J 7/00*    (2006.01)
*H05K 5/00*    (2006.01)
*H05K 1/14*    (2006.01)
*H05K 7/00*    (2006.01)

(52) U.S. Cl. .................. 320/107; 320/112; 361/679; 361/740; 361/741; 361/747

(58) Field of Classification Search .................. 320/107, 320/112–115; 361/679, 740, 741, 747
See application file for complete search history.

(56) References Cited

U.S. PATENT DOCUMENTS 6,495,987 B2    12/2002    Kuo et al.
7,160,132 B2 *    1/2007    Phillips et al. .............. 439/341

FOREIGN PATENT DOCUMENTS

CN    2574178 Y    9/2003
CN    1547211 A    11/2004

* cited by examiner

*Primary Examiner*—Akm E Ullah
*Assistant Examiner*—Richard V Muralidar
(74) *Attorney, Agent, or Firm*—Winston Hsu

(57) ABSTRACT

A portable electronic device includes a main body defining a locking hole therein and an auxiliary body having a latch therein. The latch includes a button, a slider, and a spring member positioned between the button and the auxiliary body. The slider includes a locking portion retractably inserted into the locking hole. The slider is slidably engaged with the button in a manner that when the button is pressed along a first direction, the slider is pushed by the button to slide along a second direction perpendicular to the first direction, thereby retracting the locking portion from the locking hole. The spring member is for elastically loading the button in a third direction opposite to the first direction.

11 Claims, 7 Drawing Sheets

AUXILIARY BODY WITH SECURING MECHANISM AND PORTABLE ELECTRONIC DEVICE USING THE SAME

FIELD OF THE INVENTION

The present invention generally relates to an auxiliary body with a securing mechanism and a portable electronic device using the same and, more particularly, to an auxiliary body with a securing mechanism for detachably mounting the auxiliary body to a main body of a portable electronic device, and a portable electronic device using the same.

DESCRIPTION OF RELATED ART

In recent years, electronic apparatus such as portable DVD players, Notebook computers, and PDAs (Personal Digital Assistants) have been widely used due to their portability and convenience. In order to work anywhere and anytime, the portable electronic apparatus usually needs batteries. However, conventional batteries are usually unsuitable because they are not small enough to be received in the portable electronic apparatus, and portable electronic apparatuses are getting smaller and smaller.

Therefore, a portable electronic device with an exterior power supply has been proposed. The portable electronic device includes a main body and a subsidiary casing containing batteries for supplying power to the main body. Screws and nuts are used to connect the main body and the subsidiary casing. However, it is not convenient for users to attach the subsidiary casing to the main body.

Accordingly, as shown in FIGS. 6 and 7, an improved fastening mechanism for an optical disc player is proposed. The optical disc player 100 includes a main body 910 and a subsidiary casing 920 removably attached to the main body 910. The main body 910 has a first lateral surface 919 with a receptacle 991 horizontally extended therein. Two pairs of blocks 913, 914, and 915, 916 vertically extend from the first lateral surface 919 covering portions of the receptacle 991. A locking hole 912 is also defined in the first lateral surface 919 and communicates with the receptacle 991, so as to lock the subsidiary casing 920 onto the main body 910.

The subsidiary casing 920 has a second lateral surface 929, which mates with the first lateral surface 919 of the main body 910 when the subsidiary casing 920 is attached to the main body 910. The second lateral surface 929 has a hole 923. An L-shaped latch 921 perpendicularly extends from the second lateral surface 929, and is configured for being received in the receptacle 911 of the main body 910. A slider 922 is movably installed in the subsidiary casing 920. The slider 922 has a protrusion 926 at a distal end thereof. The protrusion 926 protrudes out of the subsidiary casing 920 from the hole 923 and is received into the locking hole 912 of the main body 910 for locking the subsidiary casing 920 onto the main body 910, and can be drawn back into the subsidiary casing 920 for releasing the subsidiary casing 920 from the main body 910. The slider 922 further forms a pushing part 924 on a surface of the slider 922, adjacent to the protrusion 926. The pushing part 924 is exposed on an adjacent side surface (not labeled) to the second lateral surface 929, for users to applying a pushing force thereto. Therefore, the subsidiary casing 920 is attachable to and detachable from the main body 910.

When the subsidiary casing 920 is being attached to the main body 910, the latch 921 of the subsidiary casing 920 is inserted into the receptacle 911 and slide into position to be received and blocked by the blocks 913, 914, 915, 916. The protrusion 926 is inserted into the locking hole 912 for preventing the latch 921 from sliding along the receptacle 911. Therefore, the subsidiary casing 920 is fastened onto the main body 910.

As described above, the optical disc player 900 provides users with portability and convenience. There is, however, a shortcoming with the above procedure. When disassembling the subsidiary casing 920 from the main body 910, a friction force should be applied to the pushing part 926 of the slider 922 to force the protrusion 924 of the slider 922 to be retracted into the subsidiary casing 920. At the same time, a thrust force should be applied to the subsidiary casing 920, to push the second lateral surface 929 to slide along the first lateral surface 919. The friction force and the thrust force are substantially perpendicular to each other, and should be applied to the subsidiary casing 920 simultaneously, so that it is difficult to disassemble the subsidiary casing 920 with ease.

Accordingly, a need exists for a securing mechanism for a portable electronic device in the industry to address the aforementioned deficiencies and inadequacies.

SUMMARY OF INVENTION

A portable electronic device includes a main body defining a locking hole therein and an auxiliary body having a latch therein. The latch includes a button, a slider, and a spring member positioned between the button and the auxiliary body. The slider includes a locking portion retractably inserted into the locking hole. The slider is slidably engaged with the button in a manner that when the button is pressed along a first direction, the slider is pushed by the button to slide along a second direction perpendicular to the first direction, thereby retracting the locking portion from the locking hole. The spring member is for elastically loading the button in a third direction opposite to the first direction.

Other systems, methods, features, and advantages of the present auxiliary body and the present portable electronic device will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF DRAWINGS

Many aspects of the present auxiliary body and the present portable electronic device can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION

Reference will now be made to the drawings to describe the preferred embodiments of the present auxiliary body and the present portable electronic device, in detail.

Figure 1:
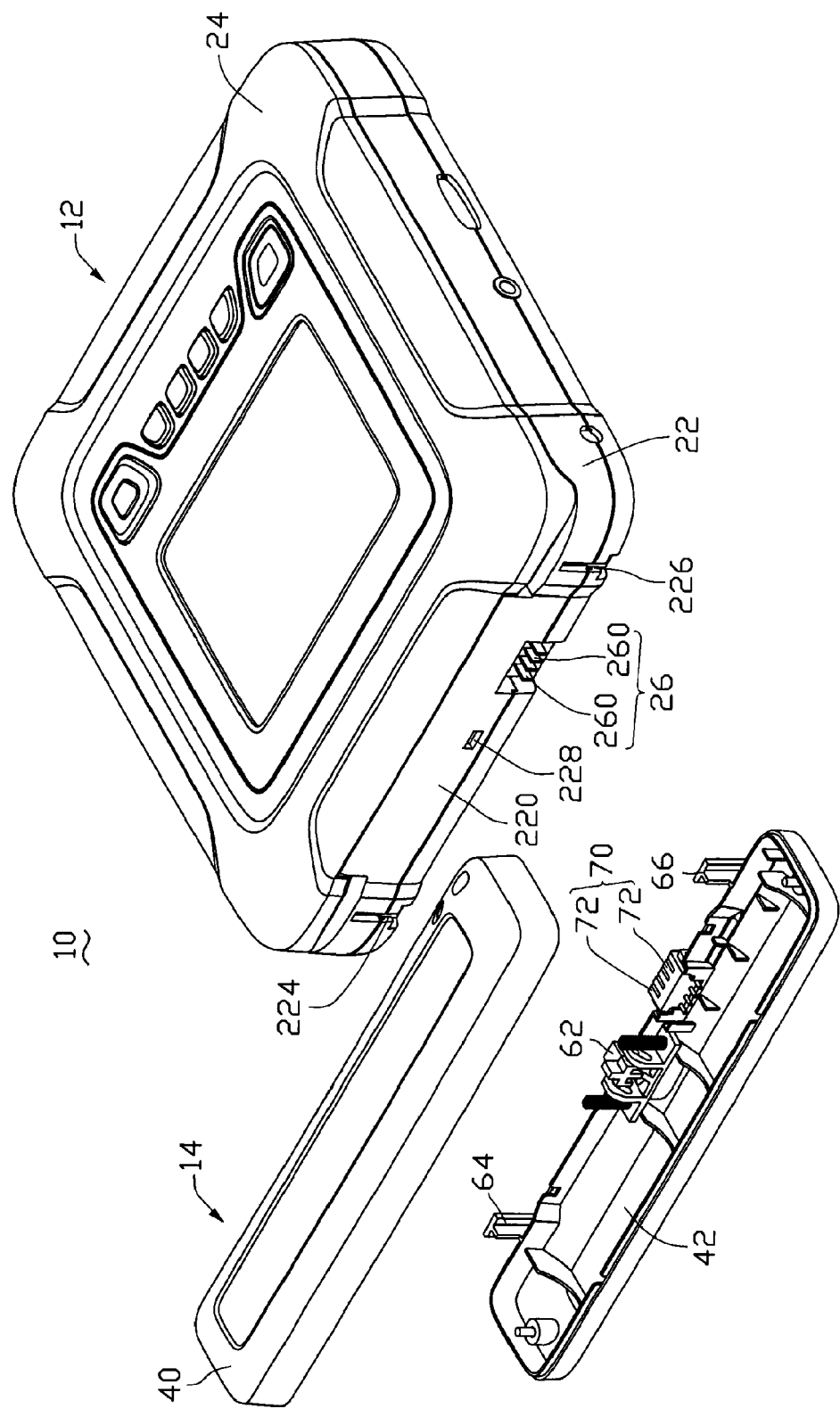
FIG. 1 is a partially exploded, isometric view of a portable electronic device in accordance with an exemplary embodiment thereof, the portable electronic device including an upper housing, a lower housing, and a latch.

Referring to FIG. 1, a portable electronic device 10 is illustrated to set up an exemplary embodiment. The portable electronic device 10 includes a main body 12 and an auxiliary body 14 removably attached to a first side wall 220 of the main body 12. The main body 12 is an essential part of the portable electronic device 10, performing most functions of the portable electronic device 10. The auxiliary body 14 may be an accessorial case, such as a battery case, a speaker, etc. The main body 12 includes a base 22 and a top 24 covering the base 22. The auxiliary body 14 includes an upper housing 40 and a lower housing 42. The upper housing 40 and the lower housing 42 are hollow, and cooperatively form a space therein. The main body 12 and the auxiliary body 14 are electrically connected to each other via a first connector 26 of the main body 12 and a second connector 70 of the auxiliary body 14. The first connector 26 includes a plurality of first contacts 260 spaced apart from each other by a plurality of first spaces (not labeled). The second connector 70 includes a plurality of second contacts 72 spaced apart from each other by a plurality of second spaces (not labeled). The first and second connectors 260, 72 are electrically conductive, and can be respectively inserted in the corresponding second and first spaces.

A pair of channels 224, 226 and a locking hole 228 are respectively defined in two approximately opposite edges and an approximate center of the first side wall 220 of the main body 12. Correspondingly, a pair of plugs 64, 66 and a latch 62 is respectively formed on two approximately opposite edges and an approximate center of the auxiliary body 14.

Figure 2:
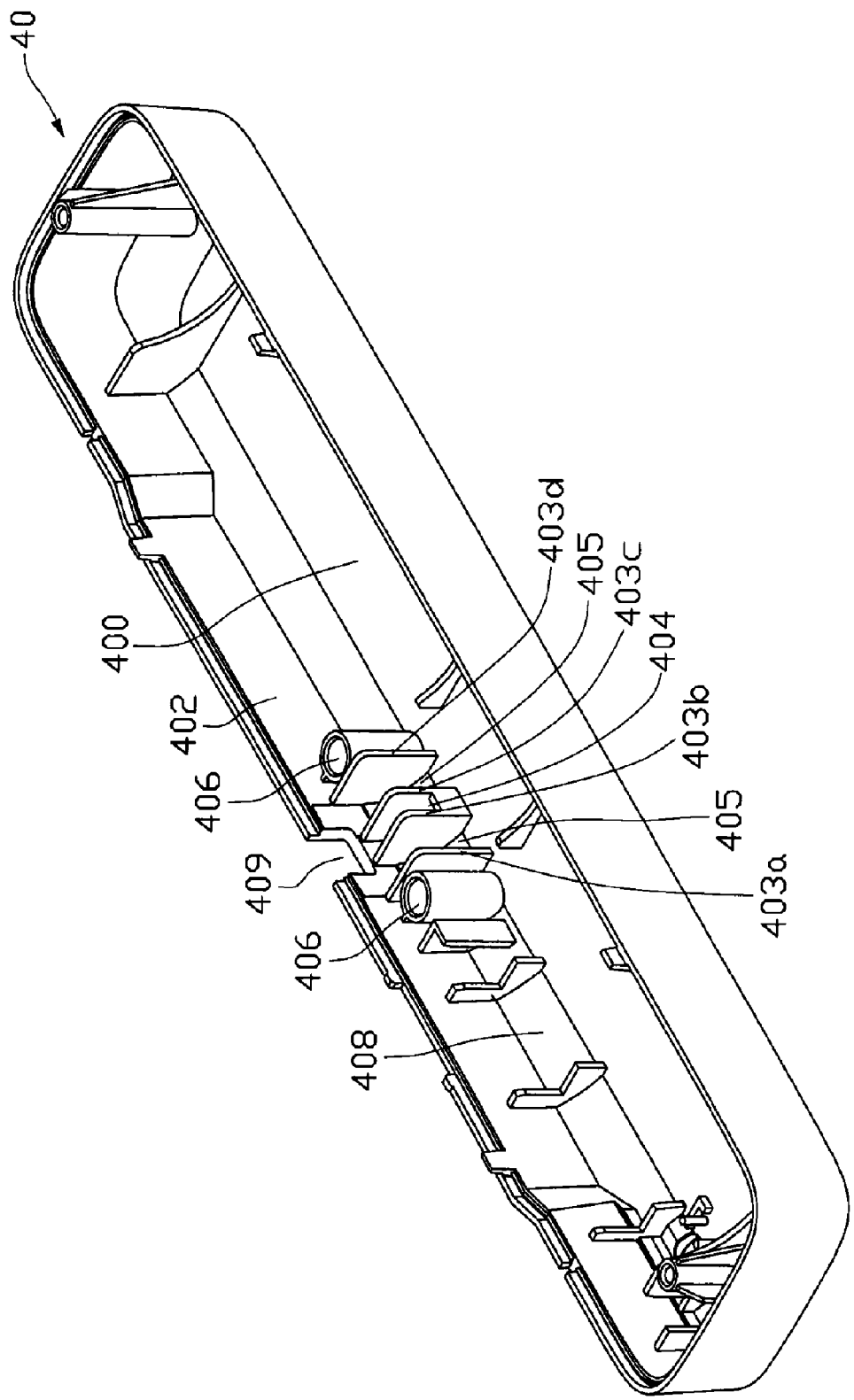
FIG. 2 is an isometric view of the upper housing of the portable electronic device of FIG. 1.

Referring to FIG. 2, the upper housing 40 of the auxiliary body 14 includes a top plate 400, a first side plate 402 perpendicular to the top plate 400, and a joint plate 408 slantways joining the top plate 400 and the first side plate 402. Four parallel guiding ribs 403a, 403b, 403c, and 403d are successively formed on the top plate 400, extending to the joint plate 408 and the first side plate 402. A first guiding groove 404 is defined between the guiding ribs 403b, 403c. A pair of second guiding grooves 405 is respectively defined between the guiding ribs 403a, 403b and the guiding ribs 403c, 403d. A pair of receiving posts 406 extends perpendicularly from the top plate 400. The receiving posts 406 are spaced apart by the guiding ribs 403a, 403d. A notch 409 is defined in a middle of the first side plate 402.

Figure 3:
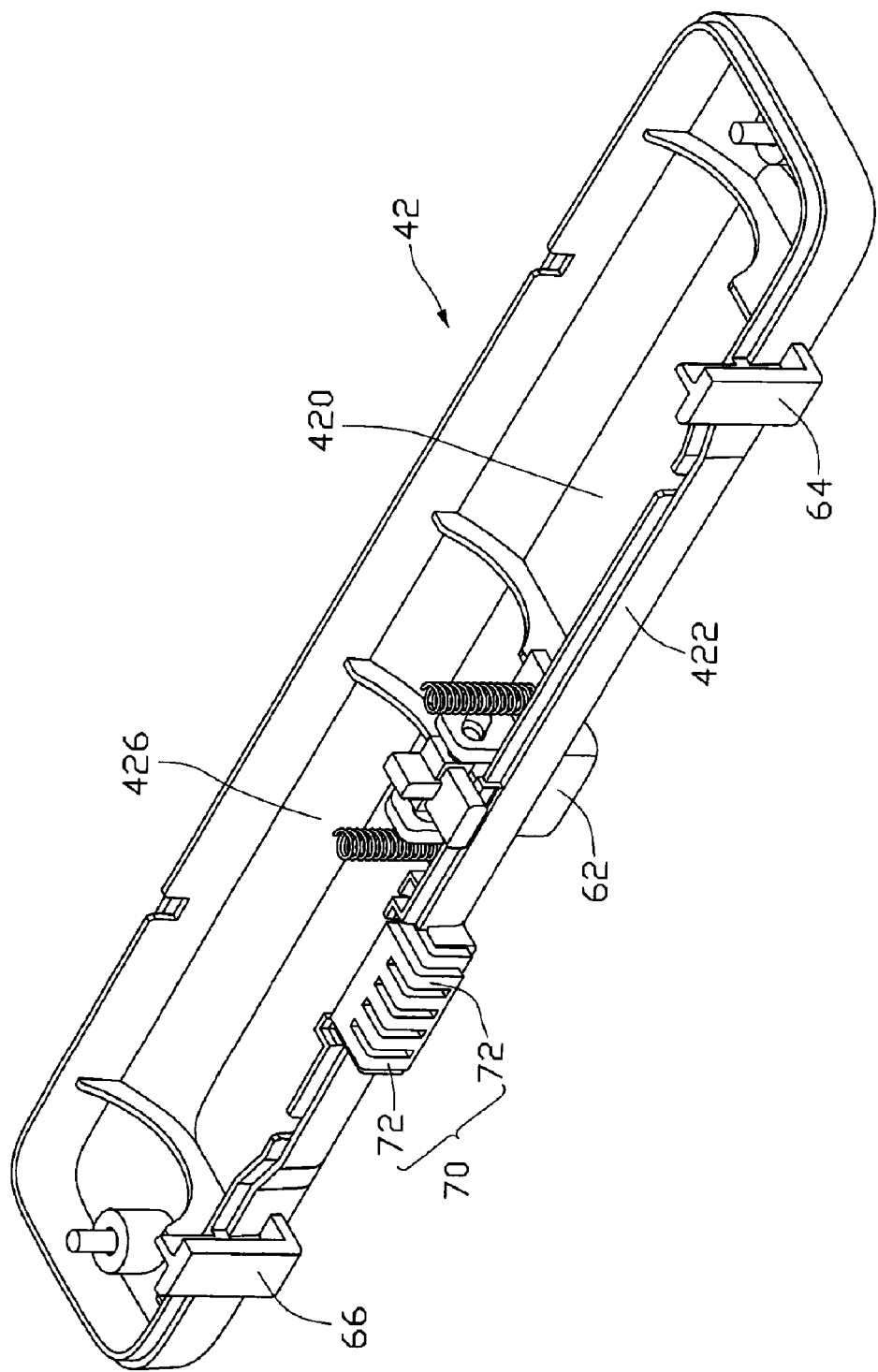
FIG. 3 is an isometric view of the lower housing of the portable electronic device of FIG. 1, with the latch mounted thereon.
Figure 4:
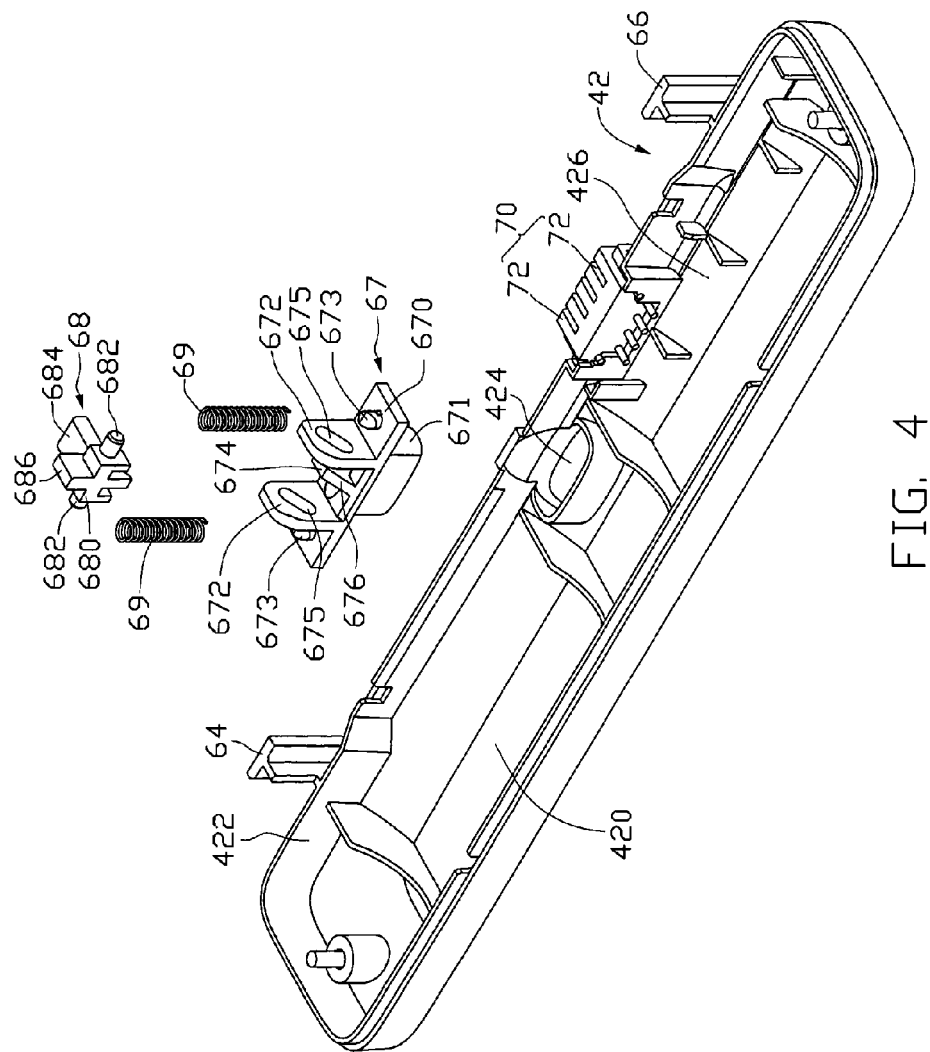
FIG. 4 is an exploded, isometric view of FIG. 3.

Referring to FIG. 3 and FIG. 4, the lower housing 42 of the auxiliary body 14 includes a bottom plate 420, a second side plate 422 perpendicular to the bottom plate 420, and a joint plate 426 slantways joining the bottom plate 420 and the second side plate 422. The plugs 64, 66 are formed on an exterior surface of the second side plate 422 to be removably inserted in the channels 224, 226 of the main body 12 respectively. Between the plugs 64, 66, an opening 424 is defined in the joint plate 426 to allow a portion of the latch 62 to extend thereinto.

Figure 5:
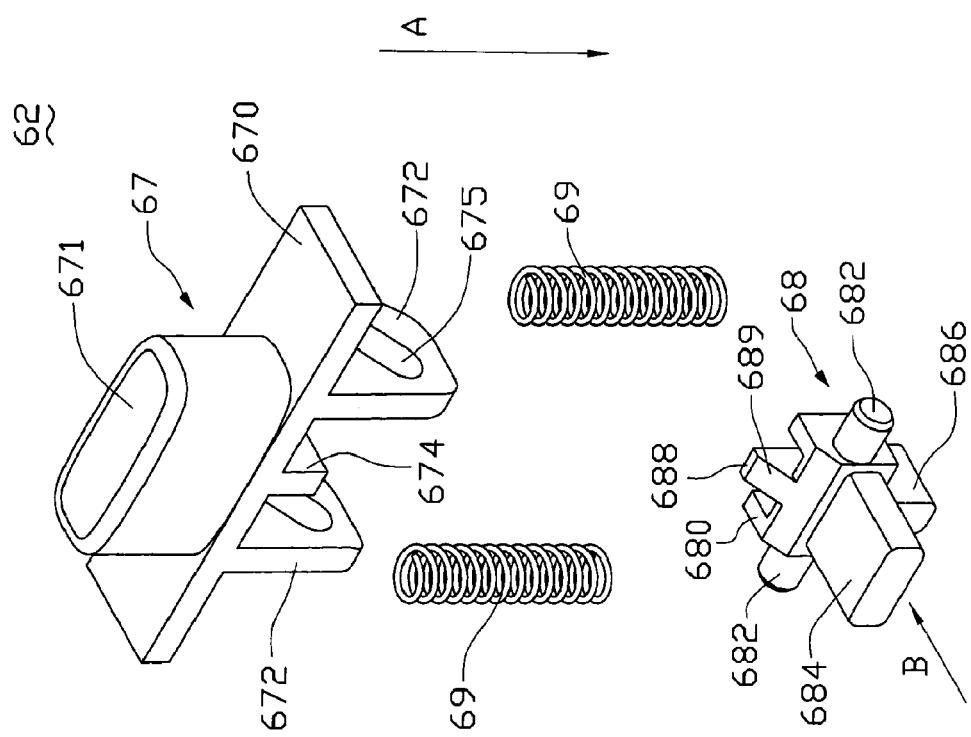
FIG. 5 is an enlarged, exploded view of the latch of FIG. 3.
Figure 6:
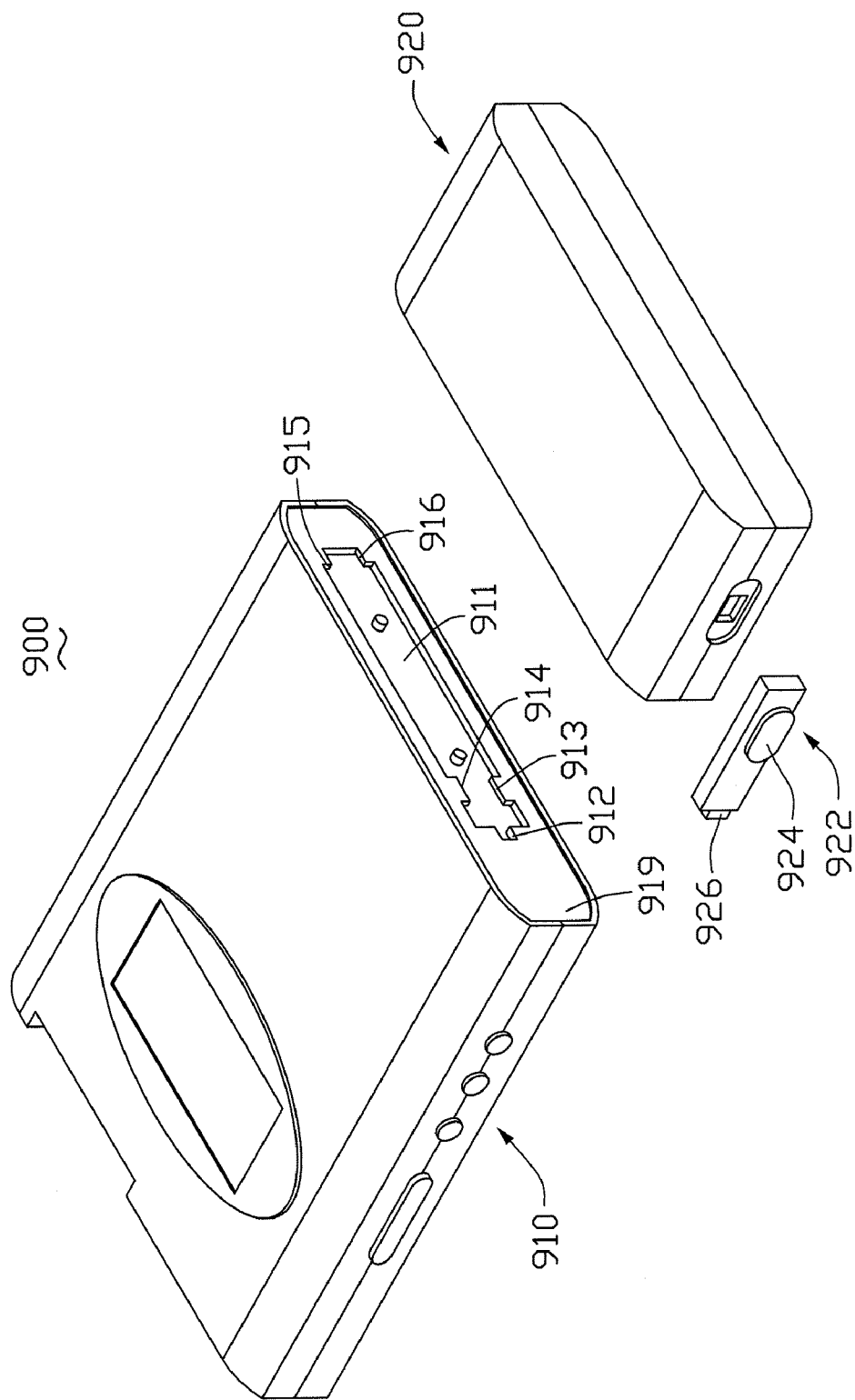
FIG. 6 is an exploded, isometric view of a conventional portable electronic device.
Figure 7:
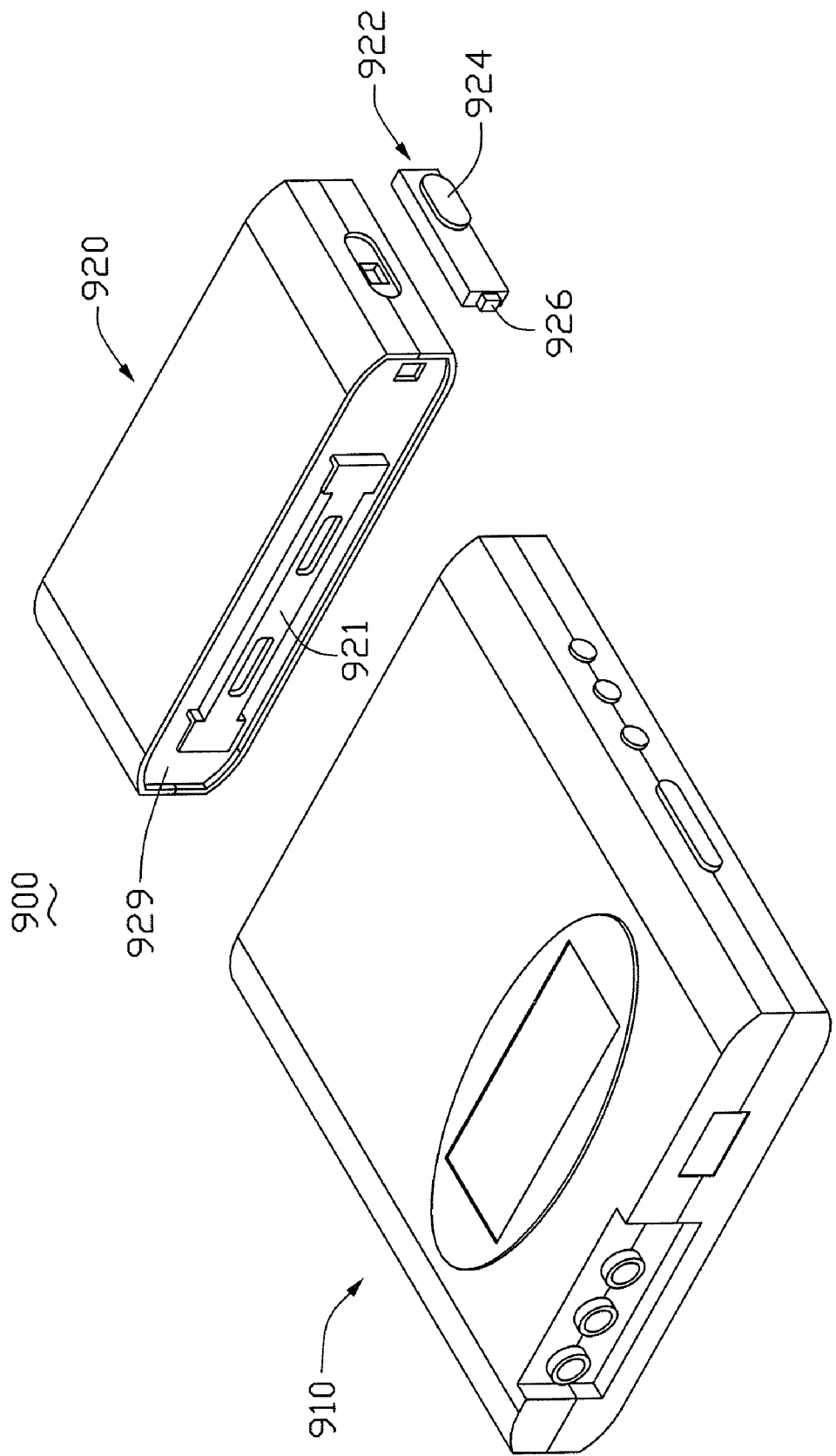
FIG. 7 is similar to FIG. 6, but viewed from another aspect.

Referring also to FIG. 5, which is an enlarged, exploded view of the latch 62, the latch 62 includes a button 67, a pair of springs 69 elastically supporting the button 67, and a slider 68 slidably engaged with the button 67.

The button 67 includes a horizontal plate portion 670, a pressing portion 671, a pair of lug portions 672, a pair of post portions 673 (as shown in FIG. 4), and a first wedge portion 674. The pressing portion 671 is formed on a surface of the plate portion 670. The pressing portion 671 defines travel in a first direction 'A' for the button 67 when pressed. The first direction 'A' is substantially perpendicular to the plate portion 671. The pressing portion 671 protrudes down from the opening 424 of the lower housing 42, thereby allowing users to press thereon to activate the latch 62. The lug portions 672, the post portions 673, and the first wedge portion 674 are respectively formed on another surface of the plate portion 670, opposite to the pressing portion 671. The first wedge portion 674 with a first bevel 676 is formed on a middle of the plate portion 670. The lug portions 672 are spaced apart by the first wedge portion 674, to a same distance as between the second guiding grooves 405 of the upper housing 40. An oblique slot 675 is defined in each of the lug portions 672. The slots 675 are parallel to each other, and have a same gradient as the first bevel 676 of the first wedge portion 674. The lug portions 672 are respectively received or partially received in the second guiding grooves 405 of the upper housing 40. The post portions 673 are spaced apart by the lug portions 675. One end of each of the springs 69 fits over the corresponding post portion 673, while the other end is received in the corresponding receiving post 406 of the upper housing 40. Therefore, an elastic deformation direction of the springs 69 is parallel to the first direction 'A' of the pressing portion 671. That is, the elastic force provided by the springs 69 performs as a restoration force for the button 67, after a pressing force has been applied and released.

The slider 68 includes a block portion 680, a pair of pin portions 682, a tongue portion 684, a rib portion 686, and a second wedge portion 688 respectively extending from five different directions of the block portion 680. The pin portions 682 extending in opposite directions from the block portion 680 are slidably received in the slots 675 of the button 67. The tongue portion 684 extends along a second direction 'B', which is in a substantially perpendicular direction to the first direction 'A' in FIG. 5. The tongue portion 684 is received in the notch 409 of the upper housing 40, and is retractable relative to the first side plate 402. The second wedge portion 688 is formed opposite to the first wedge portion 674 of the button 67. A second bevel 689 of the second wedge portion 688 and the first bevel 676 of the first wedge portion 674 of the button 67 are slidably mated together, and the second bevel 689 has a same gradient as that of the slots 675 of the button 67. The rib portion 686 extends along a direction opposite to the second wedge portion 674 to support the slider 68 and the button 67 thereon. The rib portion 686 is slidable in the first guiding groove 404 of the upper housing 40, along the second direction 'B'.

In assembly of the auxiliary body 14, the pin portions 682 of the slider 68 are forced into the corresponding slots 675 of the button 67, with the second bevel 689 being mated with the first bevel 676. The springs 69 are respectively positioned in the receiving posts 406 of the upper housing 40. After that, the button 67 with the slider 68 engaged therewith is placed on the springs 69. The post portions 673 of the button 67 are inserted into the springs 69, with the ends of the springs 69 pressing against the plate portion 670. The rib portion 686 of the slider 68 is received in the first guiding groove 404 of the upper housing 40. Finally, the lower housing 42 is screwed to or coupled to the upper housing 40 by other known means, and the assembly of the auxiliary body 14 is thus accomplished.

In assembly of the auxiliary body 14 to the main body 12, the main body 12 of the portable electronic device 10 and the auxiliary body 14 are held upside down. The plugs 64, 66 of the inverted auxiliary body 14 are aligned with the channels 224, 226 of the inverted main body 12. The button 67 is pressed down and the tongue portion 684 of the slider 68 retracts into the auxiliary body 14, while the plugs 64, 66 are inserted into the channels 224, 226. Gradually, the plugs 64, 66 are inserted, and the tongue portion 684 of the slider 68 resists against the first side wall 220 of the main body 12. After the plugs 64, 66 are wholly inserted into the channels 224, 226, the tongue portion 684 of the slider 68 extends into the locking hole 228 of the main body 12. Accordingly, the auxiliary body 14 is firmly secured to the main body 12.

When removing the auxiliary body 14, the pressing portion 671 of the button 67 is pressed along the first direction 'A'. With the button 67 being pressed along the first direction 'A', the springs 69 are compressed, and the slider 68 is forced to slide along the second direction 'B' due to either of the engagement of the pin portions 682 of the slider 68 and slots 675 of the button 67 or the engagement of the first wedge portion 674 and the second wedge portion 688. Meanwhile, the tongue portion 684 of the slider 68 is retracted from the locking hole 228. Then, the auxiliary body 14 is pushed to slide along the channels 224, 226 of the main body 12, until the plugs 64, 66 exit the channels 224, 226. Therefore, the auxiliary body 14 is detached from the main body 12. The button 67 is restored by the elastic force applied by the springs 69, after being released.

As described above, a commutating configuration constructed by the pin portions 682 of the slider 68 and the slots 675 of the button 67 or the first wedge portion 674 and the second wedge portion 688, commutes a pressing force along the first direction 'A' into a force along the second direction 'B'. That is, the pressing force acted on the button 67 and the pushing forces acted on the plugs 64, 66 are perpendicular to each other. Thus, it is easy to detach the auxiliary body 14 from the main body 12.

It should be emphasized that the above-described embodiments of the present invention, including any preferred embodiments, are merely possible examples of implementation of the principles of the invention, and are merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and be protected by the following claims.

What is claimed is:

1. A portable electronic device comprising:
   a main body defining a locking hole therein; and
   an auxiliary body comprising a latch therein, the latch including:
      a button;
      a slider including a locking portion retractably inserted into the locking hole, the slider being slidably engaged with the button in a manner that when the button is pressed along a first direction, the slider is pushed by the button to slide along a second direction perpendicular to the first direction, thereby retracting the locking portion from the locking hole; and
      a spring member positioned between the button and a portion of the auxiliary body for elastically loading the button in a third direction opposite to the first direction;
   wherein the button includes a pair of lug portions, each of the lug portions defines a slot therein oriented in an oblique direction relative to the first direction, and the slider forms a pair of pins slidably engaged in the slots.

2. The portable electronic device as claimed in claim 1, wherein the button comprises a first wedge portion, the slider comprises a second wedge portion, and the first and second wedge portions are slidably mated together.

3. The portable electronic device as claimed in claim 1, wherein the main body defines a pair of channels therein, the auxiliary body forms a pair of plugs, and the plugs are inserted into the channels along the first direction when the locking portion of the slider inserts into the locking hole of the main body.

4. A portable electronic device comprising:
   a first body;
   a second body detachably mounted to the first body; and
   a securing mechanism for securing the second body to the first body and unlocking the second body from the first body, the securing mechanism comprising:
      a pressing portion movably mounted to one of the first body and the second body for being acted on by a first force along a first direction;
      a commutating portion engaged with the pressing portion configured for commutating said first force to a second force along a second direction;
      a restoring portion pressing on the pressing portion for restoring the pressing portion against said first force; and
      a locking portion fixed to the commutating portion, the locking portion selectively locking the second body to the first body, and releasing the second body from the first body upon being acted on by said second force;
   wherein the commutating portion comprises a pin and a lug portion, a side of the lug portion has an angle formed obliquely relative to both said first and second directions, and the pin is slidable in or against the lug portion.

5. The portable electronic device as claimed in claim 4, wherein the pressing portion protrudes from the one of the first body and second body.

6. The portable electronic device as claimed in claim 4, wherein the lug portion defines a slot oriented in an oblique direction relative to both said first and second directions, and the pin is slidably received in the slot.

7. The portable electronic device as claimed in claim 6, wherein the commutating portion further comprises a first wedge and a second wedge, and the first wedge and the second wedge are slidably mated together.

8. The portable electronic device as claimed in claim 7, wherein the first wedge and the second wedge have a same gradient as the slot defined in the lug portion.

9. The portable electronic device as claimed in claim 4, wherein the locking portion is retractable relative to the one of the first body and second body.

10. The portable electronic device as claimed in claim 4, further comprising a pair of plugs formed on one of the first body and second body, and the other of the first body and second body defines a pair of channels therein to receive the plugs therein.

11. The portable electronic device as claimed in claim 4, wherein the first direction is perpendicular to the second direction.

* * * * *